United States Patent
Ippadi Veerabhadre Gowda et al.

(10) Patent No.: US 12,236,526 B1
(45) Date of Patent: Feb. 25, 2025

(54) EXCLUDING OBJECTS DURING 3D MODEL GENERATION

(71) Applicant: Apple Inc., Cupertino, CA (US)

(72) Inventors: Praveen Gowda Ippadi Veerabhadre Gowda, San Jose, CA (US); Quinton L. Petty, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/126,649

(22) Filed: Mar. 27, 2023

Related U.S. Application Data (63) Continuation of application No. 17/159,360, filed on Jan. 27, 2021, now Pat. No. 11,640,692.

(60) Provisional application No. 62/969,740, filed on Feb. 4, 2020.

(51) Int. Cl.

| | |
|---|---|
| *G06T 17/00* | (2006.01) |
| *G06N 3/04* | (2023.01) |
| *G06N 20/00* | (2019.01) |
| *G06T 7/10* | (2017.01) |
| *G06T 7/20* | (2017.01) |
| *G06T 7/50* | (2017.01) |

(52) U.S. Cl.
CPC .............. *G06T 17/00* (2013.01); *G06N 3/04* (2013.01); *G06N 20/00* (2019.01); *G06T 7/10* (2017.01); *G06T 7/20* (2013.01); *G06T 7/50* (2017.01); *G06T 2207/20081* (2013.01); *G06T 2207/20084* (2013.01)

(58) Field of Classification Search
CPC .. G06T 17/00; G06T 7/10; G06T 7/20; G06T 2207/20081; G06T 2207/20084; G06T 2207/10028; G06T 7/11; G06T 7/70; G06T 7/50; G06T 2219/2021; G06N 20/00; G06N 3/04; G06V 20/64; G06V 10/25; G06V 10/764; G06K 9/6267; G06K 9/629; G06F 3/04815; H04N 13/128; H04N 13/271

See application file for complete search history.

(56) References Cited

U.S. PATENT DOCUMENTS

| | | | |
|---|---|---|---|
| 8,401,225 B2 | 3/2013 | Newcombe et al. | |
| 9,396,400 B1 * | 7/2016 | Teichman | G06V 20/52 |
| 10,210,618 B1 | 2/2019 | Kuffner et al. | |
| 10,242,455 B2 | 3/2019 | Harmsen et al. | |

(Continued)

FOREIGN PATENT DOCUMENTS

| | | |
|---|---|---|
| WO | WO 2017215899 | 12/2017 |
| WO | WO 2019092439 | 5/2019 |

OTHER PUBLICATIONS

Liu, Chen; Kim, Kihwan; Gu, Jinwei; Furukawa, Yasutaka, Kautz, Jan,"PlaneRCNN: 3D Plane Detection and Reconstruction from a Single Image", https://arxiv.org/abs/1812.04072; Dec. 10, 2018; pp. 4450-4459.

*Primary Examiner* — Xilin Guo
(74) *Attorney, Agent, or Firm* — Thompson Hine LLP (57) ABSTRACT

Various implementations disclosed herein include devices, systems, and methods that determines generates a three-dimensional (3D) model based on depth data and a segmentation mask. For example, an example process may include obtaining depth data including depth values for pixels of a first image, obtaining a segmentation mask associated with a second image, the segmentation mask identifying a portion of the second image associated with an object, and generating a 3D model based on the depth data and the mask.

20 Claims, 6 Drawing Sheets

(56) References Cited

U.S. PATENT DOCUMENTS

| | | |
|---|---|---|
| 2013/0208948 A1 | 8/2013 | Berkovich et al. |
| 2016/0342861 A1 | 11/2016 | Tuzel et al. |
| 2018/0255290 A1* | 9/2018 | Holzer ................. H04N 13/275 |
| 2018/0268237 A1 | 9/2018 | Stanimirovic et al. |
| 2020/0202534 A1* | 6/2020 | Steele ....................... G06T 7/11 |
| 2021/0233314 A1* | 7/2021 | Johnson ............. G02B 27/0172 |

* cited by examiner

EXCLUDING OBJECTS DURING 3D MODEL GENERATION

CROSS-REFERENCE TO RELATED APPLICATION

This application is a continuation of U.S. application Ser. No. 17/159,360 filed Jan. 27, 2021 which claims the benefit of U.S. Provisional Application Ser. No. 62/969,740 filed Feb. 4, 2020, each of which is incorporated by reference herein in its entirety.

TECHNICAL FIELD

The present disclosure generally relates to generating three-dimensional geometric representations of physical environments, and in particular, to systems, methods, and devices that generate geometric representations based on depth information detected in physical environments.

BACKGROUND

Physical environments have been modeled (e.g., reconstructed) by generating three-dimensional (3D) meshes, utilizing 3D point clouds, and by other means. The reconstructed meshes represent 3D surface points and other surface characteristics of the physical environments' floors, walls, and other objects. Such reconstructions may be generated based on images and depth measurements of the physical environments, e.g., using RGB cameras and depth sensors.

Existing techniques for generating 3D models based on images of a physical environment and depth information detected in the physical environment may be inaccurate and inefficient when there are moving objects (e.g., people, animals, etc.) in the captured image information. Additionally, when reconstructing a physical environment, it may not be desirable to include certain objects in the 3D model. It may be desirable to exclude objects that are moving or that are considered "movable objects." For example, when an object is moving while light intensity information is captured by an RGB camera, and depth information is captured by a depth camera, there may be distortion and noise created during image acquisition. Accordingly, the noise generated from a moving object may result in undesirable or unintended appearances, for example, resulting in 3D representations that are inaccurately displayed and other noticeable issues.

SUMMARY

Various implementations disclosed herein include devices, systems, and methods that generate a three-dimensional (3D) model that excludes a person or other object that is likely to move using depth data and an object mask generated from RGB image data. The 3D model is generated based on images of a physical environment, depth information detected in the physical environment, and other information for tracking the devices/depth camera's particular position and orientation. It may be desirable to exclude various objects from the 3D model that is generated for various reasons. For example, it may be desirable to exclude objects that are not typically fixed parts of a physical environment (e.g., people, animals, etc.). Doing so may provide a more useful, realistic, or physically meaningful model. As a specific example, it may be desirable to model a physical environment in which a person is sitting on a chair by modeling the chair without the person.

In some implementations, excluding objects from a model is facilitated using segmentation or masking techniques. For example, a segmentation machine learning model may be used to generate a segmentation mask identifying objects of a particular type (e.g., person, animal, etc.) associated with motion. The segmentation mask may indicate pixel locations in a corresponding RGB image using values 0 or 1 to indicate whether the pixel locations correspond to an object to be included in the model or an object to be excluded from the model. A segmentation algorithm may be used to semantically label the objects within a physical environment using confidence levels. The 3D model may be generated based on a mask of the image (e.g., segmentation masks identifying objects that are determined to not be included in the 3D model, such as a person).

Some implementations involve a method of obtaining depth data (e.g., a densified depth image) including depth values for pixels of a first image. For example, a device may include a depth camera that captures a sparse set of depths, e.g., 20 depth values for particular locations. A densified depth image may be generated from the sparse depth data by extrapolating depth values for additional pixel positions. The device may include sensors for tracking the devices/ depth camera's particular position and orientation (i.e., pose) using odometry, visual inertial odometry (VIO), simultaneous localization and mapping (SLAM), etc. and this position/pose data can be used to align the depth data with the light intensity image data and mask data.

The exemplary method further involves obtaining a segmentation mask associated with a second image. The segmentation mask identifies a portion of the second image associated with an object. For example, the device may include a light intensity camera (e.g., RGB camera) that captures the second image and a segmentation machine learning model may generate the segmentation mask identifying objects of a particular type (e.g., person, cat) associated with motion (e.g., people frequently move, furniture does not). In some implementations, the mask may indicate whether the pixel locations correspond to an object to be included in the model or an object to be excluded from the model. For example, a mask may use values 0 or 1 to identify whether an object is associated with motion (e.g., "value=1", thus exclude or mask that particular object such as a person or animal) or whether the object is not associated with motion (e.g., "value=0", thus keep that particular object because it is not associated with motion such as a person). In some implementations, the segmentation machine learning model may be a neural network. The device may include a neural engine/circuits on the processor chip tuned to accelerate neural network and other artificial intelligence (AI) processes. In some implementations, the segmentation mask may include confidence values at the pixel level. For example, a pixel location may be labeled as 0.8 chair, thus, the system is 80% confident that the x,y,z coordinates for that pixel location is a chair. As additional data is obtained, the confidence level may be adjusted.

The exemplary method further involves generating a 3D model based on the depth data and the mask. For example, the 3D model may be a mesh or a 3D point cloud. Additionally, the segmentation mask may be used to exclude certain depth values, i.e., those corresponding to the same portions of the aligned first and second images, from use in generating or updating the 3D model. In some implementations, the segmentation mask confidence values may be taken into account, and the 3D model may include its own confidence values.

In some implementations, the first image and the second image each comprise a plurality of pixel locations, wherein each pixel in the first image and each pixel in the second image are located at one of the plurality of pixel locations, wherein pixel locations in the first image are spatially correlated and are aligned with pixel locations in the second image.

In some implementations, the exemplary method further involves generating the 3D model based on the depth data and the mask includes excluding from the 3D model data associated with the identified portions of the second image associated with the object.

In some implementations, the segmentation mask identifies portions of the second image associated with a person. In some implementations, the segmentation mask identifies portions of the second image associated with an animal. In some implementations, the segmentation mask identifies portions of the second image associated with the object that is associated with motion. Additionally, or alternatively, the segmentation mask identifies portions of the second image associated with any type of object (whether the object is associated with "movement" or not) that the system has semantically labeled and that is desired to be masked out of the generated 3D model.

In some implementations, the segmentation mask is generated by determining whether to associate a category from a set of categories for each pixel in the second image based on characteristics the pixel exhibits, and determining, for each determined pixel in the second image that is associated with a category, a confidence value based on the characteristics the pixel exhibits in the second image.

In some implementations, generating the 3D model includes updating the 3D model using multiple depth images and corresponding segmentation masks obtained over a period of time. In some implementations, the updating includes updating a first portion of the 3D model at a higher rate than a second portion of the 3D model. For example, a high frequency portion around the object and lower frequency portions elsewhere. In some implementations, the updating is based on determining motion of the object.

In some implementations, the segmentation mask uses a machine learning model that uses a representation of the second image as input. In some implementations, the machine learning model is a neural network configured to be executed by a neural engine/circuits on a processor chip tuned to accelerate artificial intelligence software.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1:
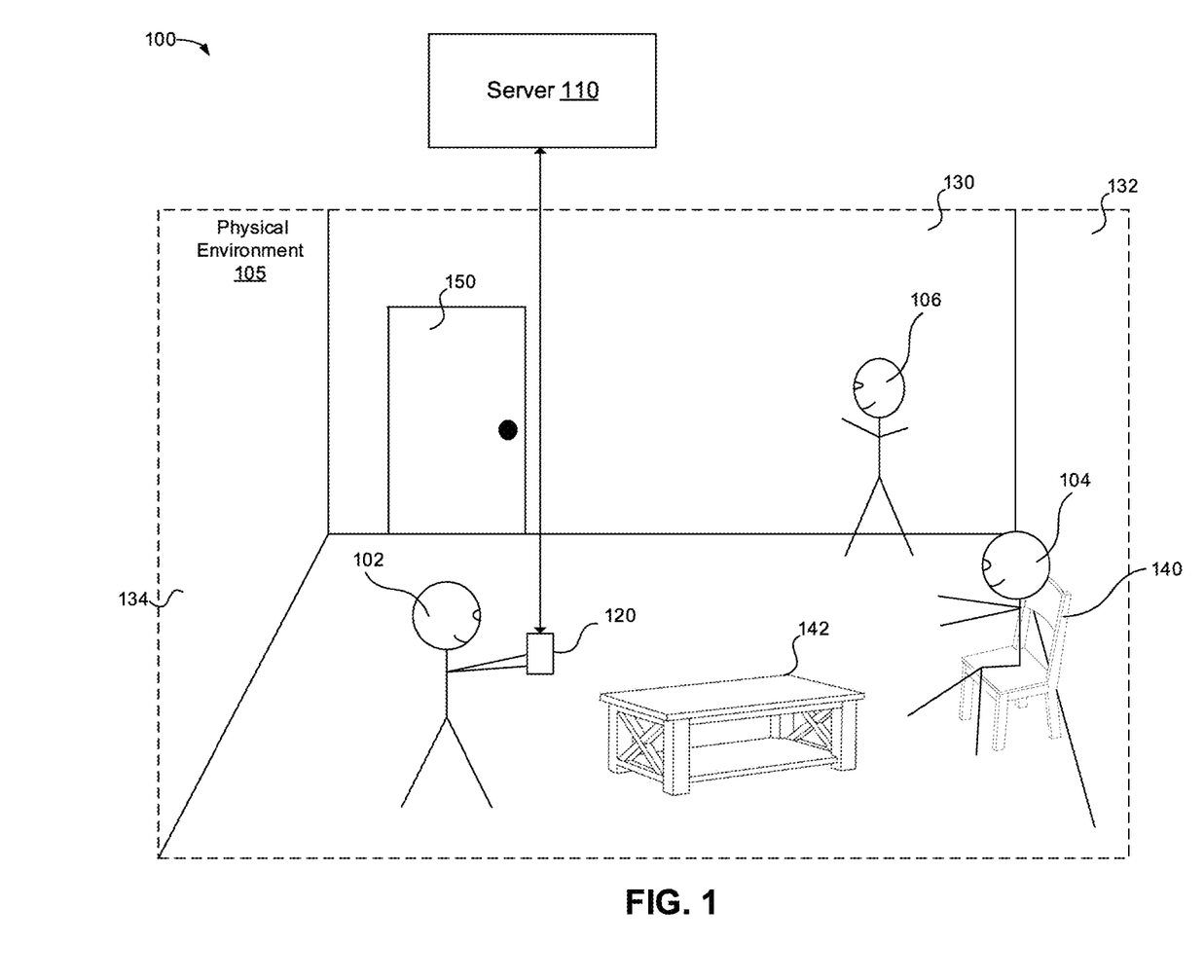
FIG. 1 is a block diagram of an example operating environment in accordance with some implementations.

FIG. 1 is a block diagram of an example operating environment 100 in accordance with some implementations. In this example, the example operating environment 100 illustrates an example physical environment 105 that includes walls 130, 132, 134, chair 140, table 142, door 150. Additionally, the example operating environment 100 includes a person (e.g., user 102) holding a device (e.g., device 120), a person (e.g., movable object 104) sitting on the chair 140, and a person (e.g., movable object 106) standing in the physical environment 105. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a server 110 and a device 120. In an exemplary implementation, the operating environment 100 does not include a server 110, and the methods described herein are performed on the device 120.

In some implementations, the server 110 is configured to manage and coordinate an experience for the user. In some implementations, the server 110 includes a suitable combination of software, firmware, and/or hardware. The server 110 is described in greater detail below with respect to FIG. 2. In some implementations, the server 110 is a computing device that is local or remote relative to the physical environment 105. In one example, the server 110 is a local server located within the physical environment 105. In another example, the server 110 is a remote server located outside of the physical environment 105 (e.g., a cloud server, central server, etc.). In some implementations, the server 110 is communicatively coupled with the device 120 via one or more wired or wireless communication channels (e.g., BLUETOOTH, IEEE 802.11x, IEEE 802.16x, IEEE 802.3x, etc.).

In some implementations, the device 120 is configured to present an environment to the user. In some implementations, the device 120 includes a suitable combination of software, firmware, and/or hardware. The device 120 is described in greater detail below with respect to FIG. 3. In some implementations, the functionalities of the server 110 are provided by and/or combined with the device 120.

In some implementations, the device 120 is a handheld electronic device (e.g., a smartphone or a tablet) configured to present content to the user. In some implementations, the user 102 wears the device 120 on his/her head. As such, the device 120 may include one or more displays provided to display content. For example, the device 120 may enclose the field-of-view of the user 102. In some implementations, the device 120 is replaced with a chamber, enclosure, or room configured to present content in which the user 102 does not wear or hold the device 120.

Figure 2:
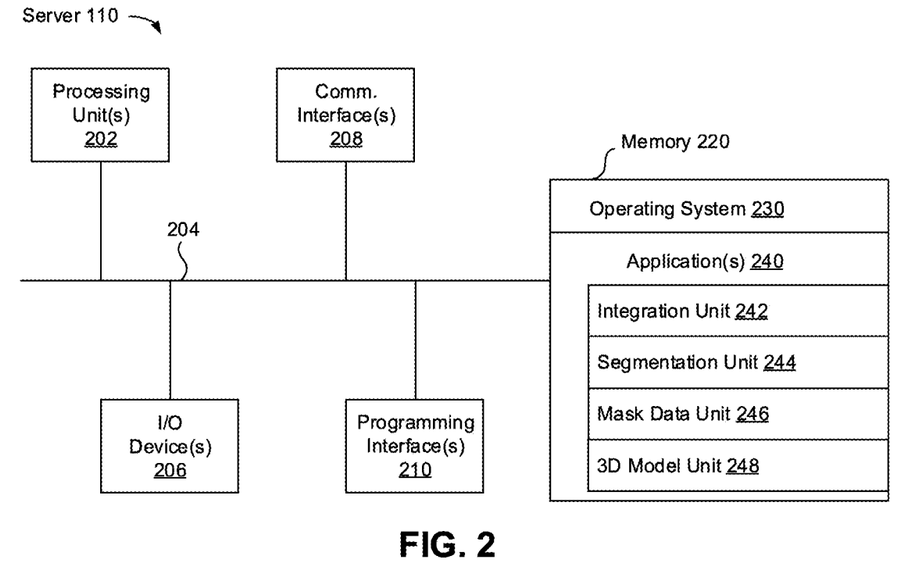
FIG. 2 is a block diagram of an example controller in accordance with some implementations.

FIG. 2 is a block diagram of an example of the server 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the server 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and one or more applications 240.

The operating system 230 includes procedures for handling various basic system services and for performing hardware dependent tasks. In some implementations, the applications 240 are configured to manage and coordinate one or more experiences for one or more users (e.g., a single experience for one or more users, or multiple experiences for respective groups of one or more users).

The applications 240 include an integration unit 242, a segmentation unit 244, a mask data unit 246, and a 3D model unit 248. The integration unit 242, the segmentation unit 244, the mask data unit 246, and the 3D model unit 248 can be combined into a single application or unit or separated into one or more additional applications or units.

The integration unit 242 is configured with instructions executable by a processor to obtain image data (e.g., light intensity data, depth data, camera position information, etc.) and integrate (e.g., fuse) the image data using one or more of the techniques disclosed herein. For example, the integration unit 242 fuses RGB images from a light intensity camera with a sparse depth map from a depth camera (e.g., time-of-flight sensor) and other sources of physical environment information (e.g., camera positioning information from a camera's SLAM system, VIO, or the like) to output a dense depth point cloud of information.

The segmentation unit 244 is configured with instructions executable by a processor to generate segmentation data of the physical environment using one or more of the techniques disclosed herein. For example, the segmentation unit 244 obtains a sequence of light intensity images (e.g., RGB) from a light intensity camera (e.g., a live camera feed) and performs a semantic segmentation algorithm to assign semantic labels to recognized features (e.g., walls, doors, floor, windows, etc.) and/or objects (e.g., furniture, appliances, people, etc.) in the image data. The segmentation unit 244 can then generate segmented data, i.e., semantic image data (e.g., RGB-S), using one or more of the techniques disclosed herein. In some implementations, the segmentation includes confidence levels for each identified feature and/or object for each pixel location.

The mask data unit 246 is configured with instructions executable by a processor to generate a mask (e.g., a segmentation mask) identifying portions of an image associated with an object (e.g., an object associated with movement) based on the image data using one or more techniques disclosed herein. For example, the mask data unit 246 obtains depth data from the integration unit 610, the segmentation data from the segmentation unit 244, and generates a segmentation mask for all identified movable objects (e.g., identifies all locations of identified people for the 3D data to provide to the 3D model unit 248). Alternatively, the mask data unit 246 generates a segmentation mask based on the segmentation data from the segmentation unit 244. Alternatively, the mask data unit 246 generates a segmentation mask based directly on the obtained depth data (e.g., a depth camera on the device 120).

In some implementations, the mask data unit 246 includes a plurality of machine learning units for each specific type of object associated with movement. For example, a class-1 neural network for people, a class-2 neural network for cats, a class-3 neural network for dogs, etc. The plurality of machine learning units can be trained for a different subset of objects such that the mask data unit 246 can provide accurate masks for each subset of object associated with movement. Alternatively, the mask data can be used to mask (e.g., filter, remove, exclude, etc.) any type of object or feature that is desired to not be included in the 3D model such that the mask data unit 246 includes a plurality of machine learning units for each specific type of object. Additionally, or alternatively, the mask data unit 246 can include a machine learning unit trained to identify an object that is moving and creating distortion or noise in the acquired image data and determine to generate a mask for that particular object (e.g., a mechanical device in the room that is generating large movements such as a large ceiling fan).

The 3D model unit 248 is configured with instructions executable by a processor to obtain 3D data, segmentation data, and mask data, and generate a 3D model using one or more techniques disclosed herein. For example, the 3D model unit 248 obtains 3D data (e.g., 3D point cloud data) from the integration unit 242, obtains segmentation data (e.g., RGB-S data) from the segmentation unit 244, obtains mask data from the mask data unit 246, other sources of physical environment information (e.g., camera positioning information), and generates a 3D model (e.g., a 3D mesh representation, a 3D point cloud with associated semantic labels, or the like) that excludes objects or features identified by the mask data.

Although these elements are shown as residing on a single device (e.g., the server 110), it should be understood that in other implementations, any combination of the elements may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
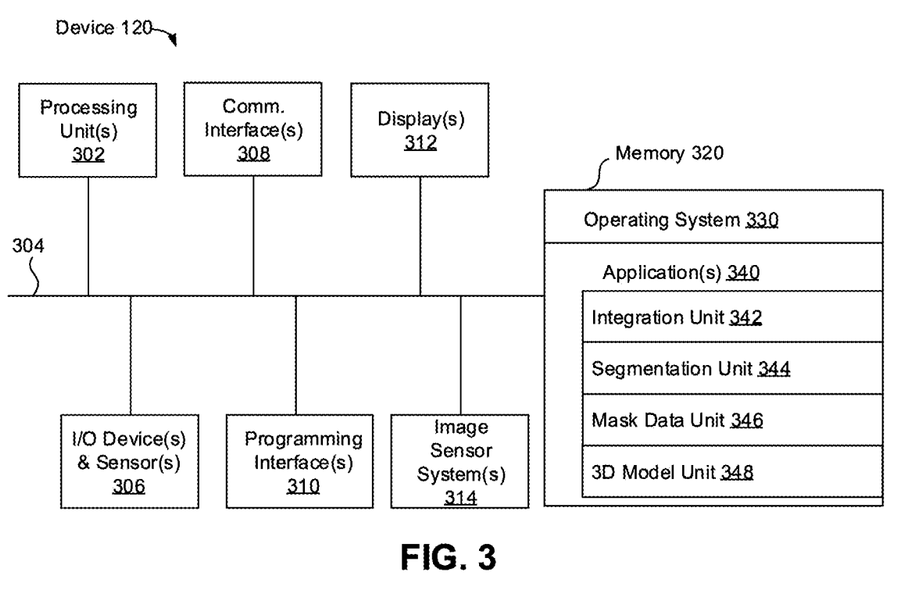
FIG. 3 is a block diagram of an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 310, one or more AR/VR displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 312 are configured to present the experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the device 120 includes a single display. In another example, the device 120 includes an display for each eye of the user.

In some implementations, the one or more image sensor systems 314 are configured to obtain image data that corresponds to at least a portion of the physical environment 105. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 314 further include illumination sources that emit light, such as a flash. In various implementations, the one or more image sensor systems 314 further include an on-camera image signal processor (ISP) configured to execute a plurality of processing operations on the image data including at least a portion of the processes and techniques described herein.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and one or more applications 340.

The operating system 330 includes procedures for handling various basic system services and for performing hardware dependent tasks. In some implementations, the applications 340 are configured to manage and coordinate one or more experiences for one or more users (e.g., a single experience for one or more users, or multiple experiences for respective groups of one or more users).

The applications 340 include an integration unit 342, a segmentation unit 344, a mask data unit 346, and a 3D model unit 348. The integration unit 342, the segmentation unit 344, the mask data unit 346, and the 3D model unit 348 can be combined into a single application or unit or separated into one or more additional applications or units.

The integration unit 342 is configured with instructions executable by a processor to obtain image data (e.g., light intensity data, depth data, camera position information, etc.) and integrate (e.g., fuse) the image data using one or more of the techniques disclosed herein. For example, the integration unit 342 fuses RGB images from a light intensity camera with a sparse depth map from a depth camera (e.g., time-of-flight sensor) and other sources of physical environment information (e.g., camera positioning information from a camera's SLAM system, VIO, or the like) to output a dense depth point cloud of information.

The segmentation unit 344 is configured with instructions executable by a processor to generate segmentation data of the physical environment using one or more of the techniques disclosed herein. For example, the segmentation unit 344 obtains a sequence of light intensity images (e.g., RGB) from a light intensity camera (e.g., a live camera feed) and performs a semantic segmentation algorithm to assign semantic labels to recognized features (e.g., walls, doors, floor, windows, etc.) and/or objects (e.g., furniture, appliances, people, etc.) in the image data. The segmentation unit 344 can then generate segmented data, i.e., semantic image data (e.g., RGB-S), using one or more of the techniques disclosed herein. In some implementations, the segmentation includes confidence levels for each identified feature and/or object for each pixel location.

The mask data unit 346 is configured with instructions executable by a processor to generate a mask (e.g., a segmentation mask) identifying portions of an image associated with an object (e.g., an object associated with movement) based on the image data using one or more techniques disclosed herein. For example, the mask data unit 346 obtains depth data from the integration unit 610, the segmentation data from the segmentation unit 344, and generates a segmentation mask for all identified movable objects (e.g., identifies all locations of identified people for the 3D data to provide to the 3D model unit 348). Alternatively, the mask data unit 346 generates a segmentation mask based on the segmentation data from the segmentation unit 344. Alternatively, the mask data unit 346 generates a segmentation mask based directly on the obtained depth data (e.g., a depth camera on the device 120).

In some implementations, the mask data unit 346 includes a plurality of machine learning units for each specific type of object associated with movement. For example, a class-1 neural network for people, a class-2 neural network for cats, a class-3 neural network for dogs, etc. The plurality of machine learning units can be trained for a different subset of objects such that the mask data unit 346 can provide accurate masks for each subset of object associated with movement. Alternatively, the mask data can be used to mask (e.g., filter, remove, exclude, etc.) any type of object or feature that is desired to not be included in the 3D model such that the mask data unit 346 includes a plurality of machine learning units for each specific type of object. Additionally, or alternatively, the mask data unit 346 can include a machine learning unit trained to identify an object that is moving and creating distortion or noise in the acquired image data and determine to generate a mask for that particular object (e.g., a mechanical device in the room that is generating large movements such as a large ceiling fan).

The 3D model unit 348 is configured with instructions executable by a processor to obtain 3D data, segmentation data, and mask data, and generate a 3D model using one or more techniques disclosed herein. For example, the 3D model unit 348 obtains 3D data (e.g., 3D point cloud data) from the integration unit 342, obtains segmentation data (e.g., RGB-S data) from the segmentation unit 344, obtains mask data from the mask data unit 346, other sources of physical environment information (e.g., camera positioning information), and generates a 3D model (e.g., a 3D mesh representation, a 3D point cloud with associated semantic labels, or the like) that excludes objects or features identified by the mask data.

Although these elements are shown as residing on a single device (e.g., the device 120), it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., applications 340) shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
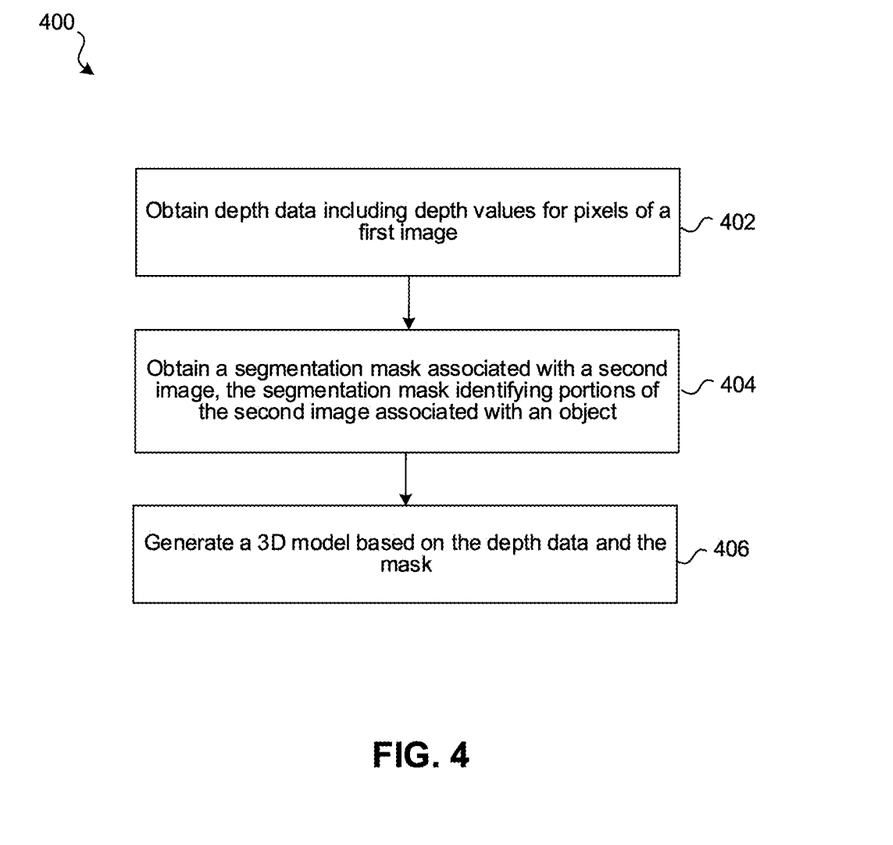
FIG. 4 is a flowchart representation of an exemplary method that generates a three-dimensional (3D) model using 3D data and a segmentation mask based on depth and light intensity image information in accordance with some implementations.

FIG. 4 is a flowchart representation of an exemplary method 400 that provides measurement data for objects within a physical environment in accordance with some implementations. In some implementations, the method 400 is performed by a device (e.g., server 110 or device 120 of FIGS. 1-3), such as a mobile device, desktop, laptop, or server device. The method 400 can be performed on a device (e.g., device 120 of FIGS. 1 and 3) that has a screen for displaying images and/or a screen for viewing stereoscopic images such as a head-mounted display (HMD). In some implementations, the method 400 is performed by processing logic, including hardware, firmware, software, or a combination thereof. In some implementations, the method 400 is performed by a processor executing code stored in a non-transitory computer-readable medium (e.g., a memory). The 3D model creation process of method 400 is illustrated with reference to FIGS. 5-6.

At block 402, the method 400 obtains depth data including depth values for pixels of a first image. For example, a user captures video while walking around the room to capture images of different parts of the room from multiple perspectives. The depth data can include pixel depth values from a viewpoint and sensor position and orientation data. In some implementations, the depth data is obtained using one or more depth cameras. For example, the one or more depth cameras can acquire depth based on structured light (SL), passive stereo (PS), active stereo (AS), time-of-flight (ToF), and the like. Various techniques may be applied to acquire depth image data to assign each portion (e.g., at a pixel level) of the image. For example, voxel data (e.g., a raster graphic on a 3D grid, with the values of length, width, and depth)

may also contain multiple scalar values such as opacity, color, and density. In some implementations, depth data is obtained from sensors or 3D models of the content of an image. Some or all of the content of an image can be based on a real environment, for example, depicting the physical environment 105 around the device 120. Image sensors may capture images of the physical environment 105 for inclusion in the image and depth information about the physical environment 105. In some implementations, a depth sensor on the device 120 determines depth values for voxels that are determined based on images captured by an image sensor on the device 120.

At block 404, the method 400 obtains a segmentation mask associated with a second image, where the segmentation mask identifies portions of the second image associated with an object. The second image includes pixels each having a value provided by a camera (e.g., RGB cameras with a complimentary metal-oxide-semiconductor (CMOS) image sensor or a charge-coupled device (CCD) image sensor, monochrome cameras, IR cameras, event-based cameras, or the like). For example, the device (e.g., device 120) may include a light intensity camera (e.g., RGB camera) that captures the second image, a segmentation machine learning model to generate the segmentation mask identifying objects of a particular type (e.g., person, cat) associated with motion (e.g., people frequently move/couches do not). In some implementations, the mask may indicate objects using values 0 or 1. In some implementations, the segmentation machine learning model may be a neural network executed by a neural engine/circuits on the processor chip tuned to accelerate AI software. In some implementations, the segmentation mask may include confidence values at the pixel level. For example, a pixel location may be labeled as 0.8 chair, thus, the segmentation machine learning model is 80% confident that the x,y,z coordinates for that pixel location is a chair. As additional data is obtained, the confidence level at each pixel location may be adjusted.

At block 406, the method 400 generates a 3D model based on the depth data and the mask. For example, the 3D model may be a 3D mesh representation or a 3D point cloud. In some implementations, the segmentation mask may be used to exclude certain depth values, e.g., those corresponding to the same portions of the aligned first and second images, from use in generating or updating the 3D model. In some implementations, the segmentation mask confidence values may be taken into account. For example, if the confidence values from the mask data are greater than or equal to a confidence value threshold (e.g., 70%) for each identified pixel for a movable object (e.g., a person), then the 3D model would exclude those particular pixel locations in the 3D model (e.g., the model of a person sitting on a chair would only include a 3D model of the chair). Additionally, or alternatively, the 3D model unit may determine its own confidence values for each pixel location based on the received data.

In use, for the process 400, a user (e.g., user 102 in FIG. 1) may scan a room with a device (e.g., a smartphone such as device 120) and the processes described herein would capture image data, identify all features and objects within the environment (e.g., walls, furniture, people, etc.), determine which objects are classified as moving objects, and provide a 3D representation for the physical environment excluding the identified moving objects as it is being scanned by the user. In some implementations, the 3D representation may be automatically displayed and updated on the user device overlaid during a live camera feed. In some implementations, the 3D representation may be provided after some type of user interaction after scanning the physical environment. For example, the user may be shown options of identified "moving" objects, and the user may select or click on the particular objects that the user does not want included in the 3D representation, and the 3D representation would then be displayed with the selected "moving" objects removed. Thus, as shown and discussed below with reference to FIGS. 5-6, the mask data unit identifies the objects associated with motion that are to be removed by model unit (e.g., 3D model unit 248 of FIG. 2, and/or 3D model unit 348 of FIG. 3).

Figure 5A:
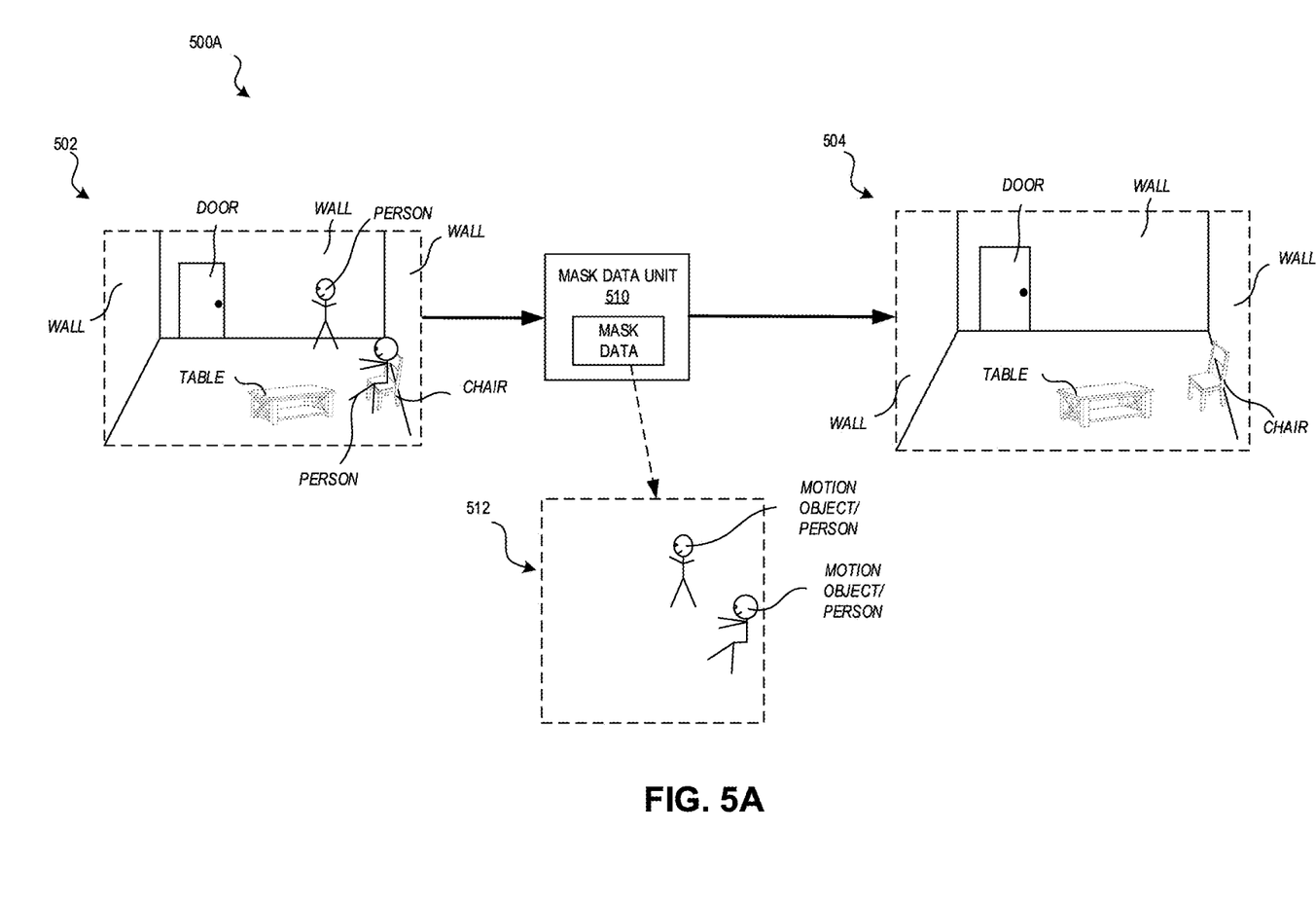
FIGS. 5A-B are block diagrams illustrating example mask data generation based on image information in accordance with some implementations.
Figure 5B:
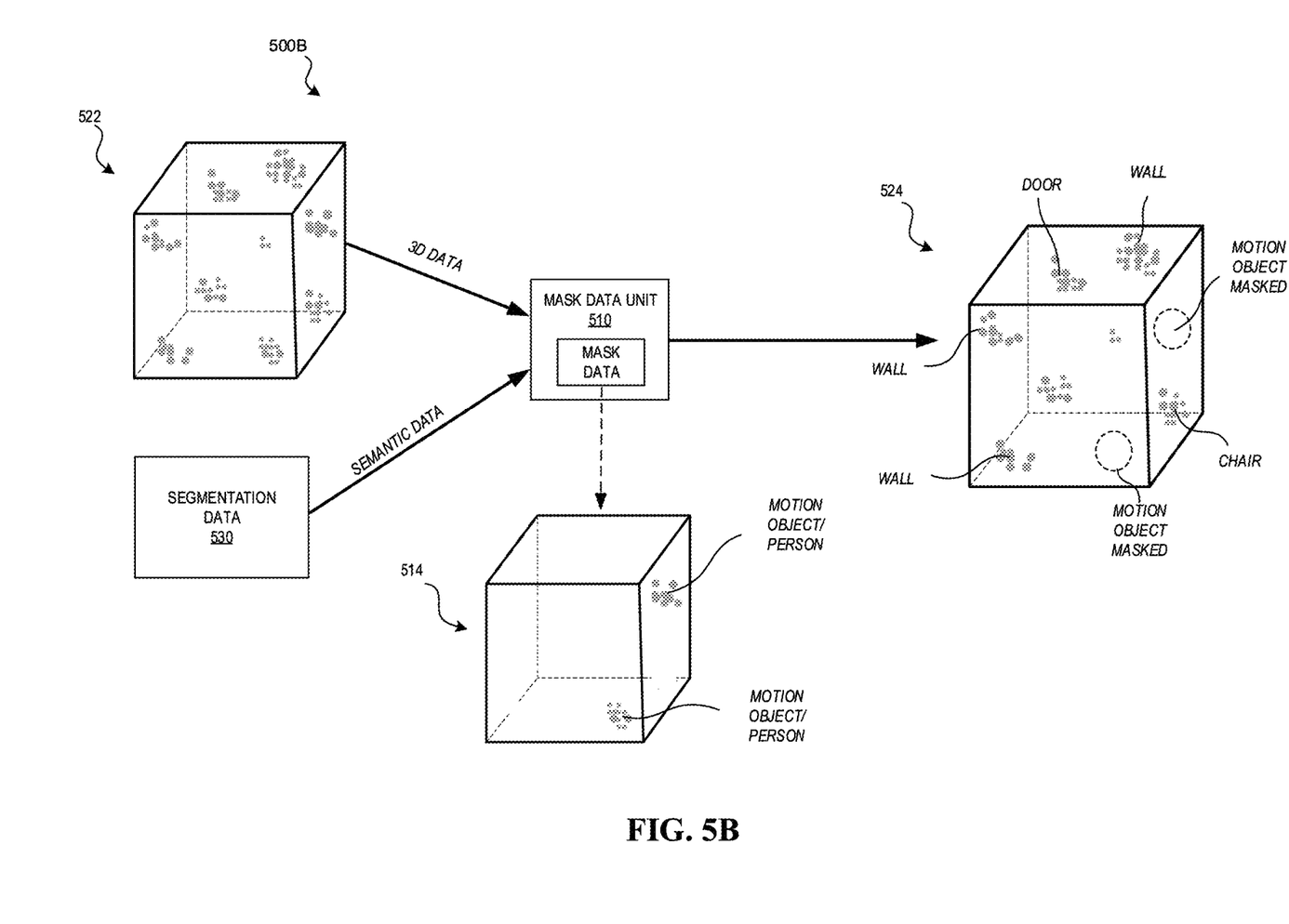

FIGS. 5A-5B are block diagrams illustrating example mask data generation based on image information in accordance with some implementations. In some implementations, the system flow of the example environments 500A, 500B is performed on a device (e.g., server 110 or device 120 of FIGS. 1-3), such as a mobile device, desktop, laptop, or server device. The system flow of the example environments 500A, 500B can be displayed on a device (e.g., device 120 of FIGS. 1 and 3) that has a screen for displaying images and/or a screen for viewing stereoscopic images such as a head-mounted display (HMD). In some implementations, the system flow of the example environments 500A, 500B is performed on processing logic, including hardware, firmware, software, or a combination thereof. In some implementations, the system flow of the example environments 500A, 500B is performed on a processor executing code stored in a non-transitory computer-readable medium (e.g., a memory).

In particular, FIG. 5A is a block diagram of an example environment 500A in which a mask data unit 510 (e.g., mask data unit 246 of FIG. 2, and/or mask data unit 346 of FIG. 3) can generate masked data 512 using semantic segmentation data based light intensity image information detected in the physical environment. FIG. 5B is a block diagram of an example environment 500B in which a mask data unit 510 (e.g., mask data unit 246 of FIG. 2, and/or mask data unit 346 of FIG. 3) can generate masked data 514 using obtained 3D data 522 (e.g., a 3D point cloud) and/or obtained semantic segmentation data 530. The masked data 512, 514, represent the objects that are associated with motion that are to be excluded. The mask data unit 510 can send the obtained image information excluding the masked data (e.g., movable objects) to a 3D model unit (e.g., 3D model unit 246 of FIG. 2, and/or 3D model unit 346 of FIG. 3). Alternatively, the mask data unit 510 can send the identified pixel locations of the identified objects associated with motion to a 3D model unit, and the 3D model unit can then determine whether or not to include or exclude the identified objects (e.g., based on confidence values).

Figure 6:
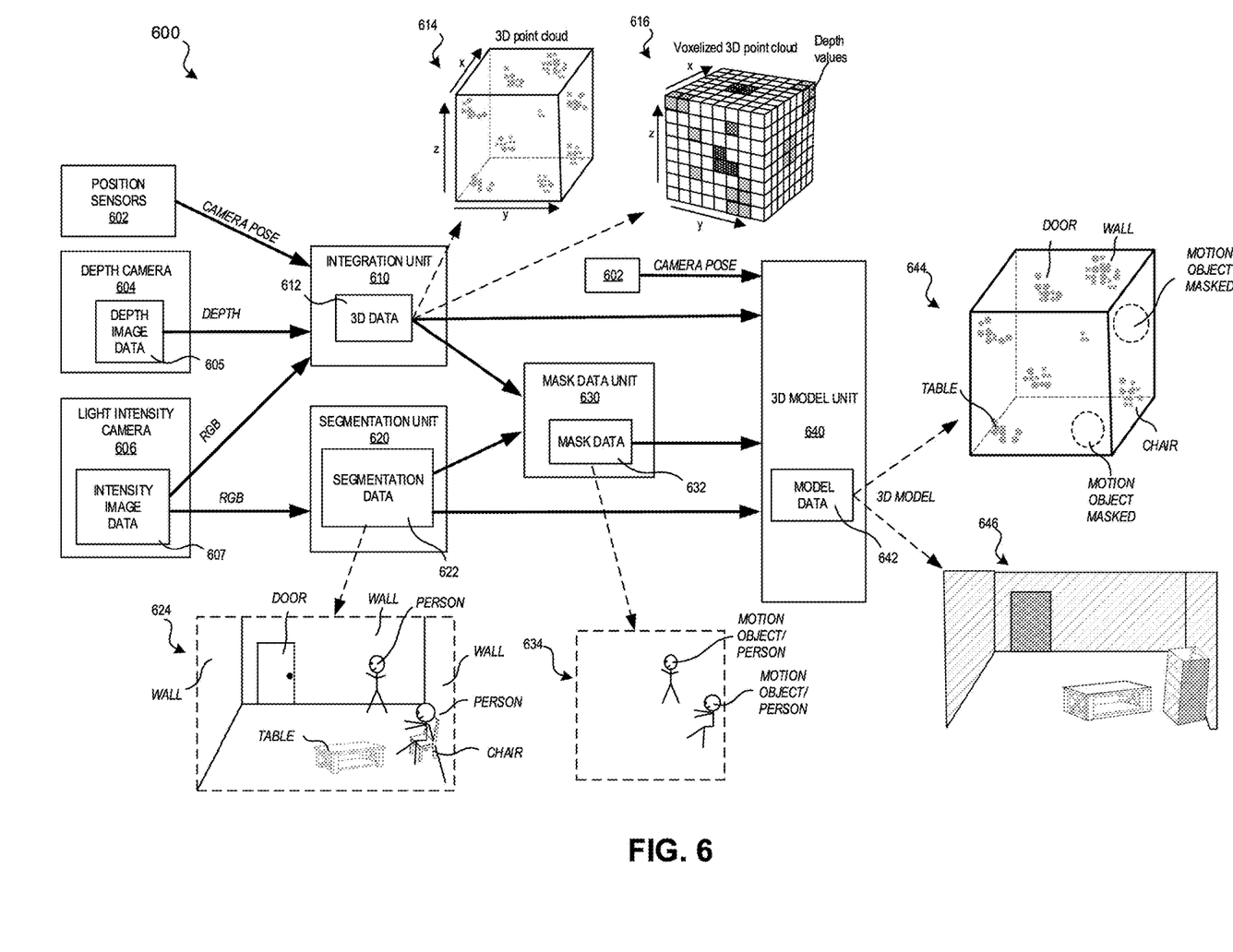
FIG. 6 is a system flow diagram of an example generation of a 3D model using 3D data and a segmentation mask based on depth and light intensity image information according to some implementations.

FIG. 6 is a system flow diagram of an example environment 600 in which a system can generate a 3D representation using 3D data and segmentation data based on depth and light intensity image information detected in the physical environment. In some implementations, the system flow of the example environment 600 is performed on a device (e.g., server 110 or device 120 of FIGS. 1-3), such as a mobile device, desktop, laptop, or server device. The system flow of the example environment 600 can be displayed on a device (e.g., device 120 of FIGS. 1 and 3) that has a screen for displaying images and/or a screen for viewing stereoscopic images such as a head-mounted display (HMD). In some implementations, the system flow of the example environment 600 is performed on processing logic, including hardware, firmware, software, or a combination thereof. In some implementations, the system flow of the example environment 600 is performed on a processor executing code stored in a non-transitory computer-readable medium (e.g., a memory).

The system flow of the example environment 600 acquires light intensity image data 607 (e.g., live camera feed from light intensity camera 606), depth image data 607 (e.g., depth image data from depth camera 604), and other sources of physical environment information (e.g., camera positioning information from position sensors 602) of a physical environment (e.g., the physical environment 105 of FIG. 1), and generates 3D model data 642. The 3D model data could be a 3D representation 644 representing the surfaces in a 3D environment using a 3D point cloud with associated semantic labels. In some implementations, the 3D model data 642 is a 3D reconstruction mesh 646 using a meshing algorithm based on depth information detected in the physical environment that is integrated (e.g., fused) to recreate the physical environment. A meshing algorithm (e.g., a dual marching cubes meshing algorithm, a poisson meshing algorithm, a tetrahedral meshing algorithm, or the like) can be used to generate a mesh representing a room (e.g., physical environment 105) and/or object(s) within a room (e.g., wall 130, door 150, chair 140, table 142, etc.). In some implementations, for 3D reconstructions using a mesh, to efficiently reduce the amount of memory used in the reconstruction process, a voxel hashing approach is used in which 3D space is divided into voxel blocks, referenced by a hash table using their 3D positions as keys. The voxel blocks are only constructed around object surfaces, thus freeing up memory that would otherwise have been used to store empty space. The voxel hashing approach is also faster than competing approaches at that time, such as octree-based methods. In addition, it supports streaming of data between the GPU, where memory is often limited, and the CPU, where memory is more abundant.

In an example implementation, the environment 600 includes an image composition pipeline that acquires or obtains data (e.g., image data from image source(s)) for the physical environment. Example environment 600 is an example of acquiring image data (e.g., light intensity data and depth data) for a plurality of image frames. The image source(s) may include a depth camera 604 that acquires depth data 605 of the physical environment, and a light intensity camera 606 (e.g., RGB camera) that acquires light intensity image data 607 (e.g., a sequence of RGB image frames).

The example environment 600 includes an integration unit 610 that is configured with instructions executable by a processor to obtain the image data (e.g., light intensity data 607, depth data 605, etc.) and positioning information (e.g., camera pose from position sensors 602) and integrate (e.g., fuse) the image data using one or more known techniques. For example, the image integration unit 610 (e.g., integration unit 242 of FIG. 2, and/or integration unit 342 of FIG. 3) receives depth image data 605 (e.g., sparse depth data) and intensity image data 607 (e.g., RGB) from the image sources (e.g., light intensity camera 606 and depth camera 604), and integrates the image data and generates 3D data 612. The 3D data 612 can include a dense 3D point cloud 614 (e.g., imperfect depth maps and camera poses for a plurality of image frames around the object) that is sent to the 3D model unit 640. In some implementations, the dense 3D point cloud 614 is also sent to the mask data unit 630. The different size grey dots in the 3D point cloud 614 represent different depth values detected within the depth data. For example, image integration unit 610 fuses RGB images from a light intensity camera with a sparse depth map from a depth camera (e.g., time-of-flight sensor) and other sources of physical environment information to output a dense depth point cloud of information. The 3D data 422 can also be voxelized, as represented by the voxelized 3D point cloud 616, where the different shading on each voxel represents a different depth value.

For the positioning information, some implementations include a visual inertial odometry (VIO) system to determine equivalent odometry information using sequential camera images (e.g., light intensity data 607) to estimate the distance traveled. Alternatively, some implementations of the present disclosure may include a SLAM system (e.g., position sensors 602). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

The example environment 600 further includes a segmentation unit 620 that is configured with instructions executable by a processor to obtain the light intensity image data (e.g., light intensity data 607) and identify and segment wall structures (wall, doors, windows, etc.) and objects (e.g., person, table, teapot, chair, vase, etc.) using one or more known techniques. For example, the segmentation unit 620 (e.g., segmentation unit 244 of FIG. 2, and/or segmentation unit 344 of FIG. 3) receives intensity image data 607 from the image sources (e.g., light intensity camera 606), and generates segmentation data 622 (e.g., semantic segmentation data such as RGB-S data). For example, the semantic segmentation data 624 illustrates an example semantically labelled image of the physical environment 105 in FIG. 1. In some implementations, segmentation unit 620 uses a machine learning model, where a semantic segmentation model may be configured to identify semantic labels for pixels or voxels of image data. In some implementations, the machine learning model is a neural network (e.g., an artificial neural network), decision tree, support vector machine, Bayesian network, or the like.

The example environment 600 further includes a mask data unit 630 that is configured with instructions executable by a processor to obtain image data and/or segmentation data, and generates mask data (e.g., a segmentation mask) using one or more known techniques. For example, the mask data unit 630 (e.g., mask data unit 246 of FIG. 2, mask data unit 346 of FIG. 3, and/or mask data unit 510 of FIG. 5B) receives 3D data 612 from the integration unit 610 and/or segmentation data 622 from the segmentation unit 620, and generates mask data 632. For example, the segmentation m mask data 634 illustrates an example semantically labelled image of identified objects associated with movement (e.g., "motion object/person") from the example physical environment 105 in FIG. 1. In some implementations, mask data unit 630 uses a machine learning model, where a segmentation mask model may be configured to identify semantic labels for pixels or voxels of image data. A segmentation mask machine learning model may generate the segmentation mask identifying objects of a particular type (e.g., person, cat) associated with motion (e.g., people frequently move, while furniture does not). In some implementations, the mask may indicate objects using values 0 or 1 to indicate whether the information should be included in the 3D model or not (e.g., motion objects). In some implementations, the segmentation machine learning model may be a neural network executed by a neural engine/circuits on the processor chip tuned to accelerate AI software. In some implementations, the segmentation mask may include confidence values at the pixel level. For example, a pixel location may be labeled as 0.8 chair, thus, the system is 80% confident that the x,y,z coordinates for that pixel location is a chair. As additional data is obtained, the confidence level may be adjusted. In some implementations, the machine learning model is a neural network (e.g., an artificial neural network), decision tree, support vector machine, Bayesian network, or the like.

The example environment 600 further includes a 3D model unit 640 that is configured with instructions executable by a processor to obtain the 3D data 612 (e.g., 3D point cloud data 614) from the integration unit 610, obtain the segmentation data 622 (e.g., RGB-S data) from the segmentation unit 620, obtain the mask data 632 from the mask data unit 630, and obtain camera positioning information (e.g., camera pose data from position sensors 602), and generate 3D model data 642 using one or more techniques. For example, the 3D model unit 640 (e.g., 3D model unit 248 of FIG. 2 and/or 3D model unit 348 of FIG. 3) generates a semantically labeled 3D point cloud 644, excluding identified motion objects in the mask data, by acquiring the 3D point cloud data 614, the mask data 632, and the semantic segmentation data 622, and using a semantic 3D algorithm that fuses the 3D data and semantic labels. As illustrated in FIG. 6, the 3D point cloud 644 excludes or masks the identified motion objects (e.g., the two people, movable objects 104 and 106, of the physical environment 105 in FIG. 1), as shown as removed by the "motion object masked" label. In some implementations, each semantic label includes a confidence value. For example, a particular point or pixel location may be labeled as an object (e.g., table), and the data point would include x,y,z coordinates and a confidence value as a decimal value (e.g., 0.9 to represent a 90% confidence the semantic label has classified the particular data point correctly). In some implementations, the segmentation mask confidence values may be taken into account. For example, if the confidence values from the mask data are greater than or equal to a confidence value threshold (e.g., 70%) for each identified pixel for a movable object (e.g., a person), then the 3D model would exclude those particular pixel locations in the 3D model (e.g., the model of a person sitting on a chair would only include a 3D model of the chair). Additionally, or alternatively, the 3D model unit may determine its own confidence values for each pixel location based on the received data.

In some implementations, the 3D model data 642 is a 3D reconstruction mesh 646 that is generated using a meshing algorithm based on depth information detected in the physical environment that is integrated (e.g., fused) to recreate the physical environment, but excludes the identified motion objects (e.g., the two people, movable objects 104 and 106, of the physical environment 105 in FIG. 1). A meshing algorithm (e.g., a dual marching cubes meshing algorithm, a poisson meshing algorithm, a tetrahedral meshing algorithm, or the like) can be used to generate a mesh representing a room (e.g., physical environment 105) and/or object(s) within a room (e.g., wall 130, door 150, chair 140, table 142, etc.). In some implementations, for 3D reconstructions using a mesh, to efficiently reduce the amount of memory used in the reconstruction process, a voxel hashing approach is used in which 3D space is divided into voxel blocks, referenced by a hash table using their 3D positions as keys. The voxel blocks are only constructed around object surfaces, thus freeing up memory that would otherwise have been used to store empty space. The voxel hashing approach is also faster than competing approaches at that time, such as octree-based methods. In addition, it supports streaming of data between the GPU, where memory is often limited, and the CPU, where memory is more abundant.

Alternatively, the mask data unit 630 generates the mask data 632 based on the segmentation data 622 without obtaining the 3D data 612, such that the 3D model unit 640 then correlates the mask data 632 with the obtained 3D data 612. Additionally, the segmentation mask may be used to exclude certain depth values, e.g., those corresponding to the same portions of the aligned first and second images, from use in generating or updating the 3D model.

In some implementations, the image composition pipeline may include virtual content (e.g., a virtual box placed on the table 135 in FIG. 1) that is generated for an extended reality (XR) environment. In some implementations, the operating systems 230, 330 includes built in XR functionality, for example, including a XR environment application or viewer that is configured to be called from the one or more applications 240, 340 to display a XR environment within a user interface. For example, the systems described herein may include a XR unit that is configured with instructions executable by a processor to provide a XR environment that includes depictions of a physical environment including real physical objects and virtual content. A XR unit can generate virtual depth data (e.g., depth images of virtual content) and virtual intensity data (e.g., light intensity images (e.g., RGB) of the virtual content). For example, one of the applications 240 for the server 110 or applications 340 for the device 120 could include a XR unit that is configured with instructions executable by a processor to provide a XR environment that includes depictions of a physical environment including real objects or virtual objects. The virtual objects may be positioned based on the detection, tracking, and representing of objects in 3D space relative to one another based on stored 3D models of the real objects and the virtual objects, for example, using one or more of the techniques disclosed herein.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
      obtaining depth data associated with a first image of an environment that includes one or more objects;
      determining that a first object of the one or more objects is moving in the environment while obtaining the depth data; and
      in response to determining that the first object is moving in the environment while obtaining the depth data:
         obtaining a segmentation mask associated with a second image of the environment, the segmentation mask identifying a portion of the second image associated with the first object; and
         generating a 3D model of the environment that excludes the first object that is determined to be moving in the environment based on the depth data and the segmentation mask, wherein the 3D model excludes the first object based on excluding depth data associated with the identified portion of the second image associated with the first object.

2. The method of claim 1, wherein the first image and the second image each comprise a plurality of pixel locations, wherein each pixel in the first image and each pixel in the second image are located at one of the plurality of pixel locations, wherein pixel locations in the first image are spatially correlated and are aligned with pixel locations in the second image.

3. The method of claim 1, wherein the segmentation mask is generated by:
   determining whether to associate a category from a set of categories for each pixel in the second image based on characteristics the pixel exhibits; and
   determining, for each determined pixel in the second image that is associated with a category, a confidence value based on the characteristics the pixel exhibits in the second image.

4. The method of claim 1, wherein generating the 3D model comprises updating the 3D model using multiple depth images and corresponding segmentation masks obtained over a period of time.

5. The method of claim 4, wherein the updating comprises updating a first portion of the 3D model at a higher rate than a second portion of the 3D model.

6. The method of claim 1, wherein the first object the segmentation mask identifies in the portion of the second image is associated with a person.

7. The method of claim 1, wherein the first object the segmentation mask identifies in the portion of the second image is associated with an animal.

8. The method of claim 1, wherein the first object the segmentation mask identifies in the portion of the second image is associated with motion.

9. The method of claim 1, wherein the segmentation mask uses a machine learning model that uses a representation of the second image as input.

10. The method of claim 9, wherein the machine learning model is a neural network configured to be executed by a neural engine/circuits on a processor chip tuned to accelerate artificial intelligence software.

11. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
   obtaining depth data associated with a first image of an environment that includes one or more objects;
   determining that a first object of the one or more objects is moving in the environment while obtaining the depth data; and
   in response to determining that the first object is moving in the environment while obtaining the depth data:
      obtaining a segmentation mask associated with a second image of the environment, the segmentation mask identifying a portion of the second image associated with the first object; and
      generating a 3D model of the environment that excludes the first object that is determined to be moving in the environment based on the depth data and the segmentation mask, wherein the 3D model excludes the first object based on excluding depth data associated with the identified portion of the second image associated with the first object.

12. The device of claim 11, wherein the first image and the second image each comprise a plurality of pixel locations, wherein each pixel in the first image and each pixel in the second image are located at one of the plurality of pixel locations, wherein pixel locations in the first image are spatially correlated and are aligned with pixel locations in the second image.

13. The device of claim 11, wherein the segmentation mask is generated by:
   determining whether to associate a category from a set of categories for each pixel in the second image based on characteristics the pixel exhibits; and
   determining, for each determined pixel in the second image that is associated with a category, a confidence value based on the characteristics the pixel exhibits in the second image.

14. The device of claim 11, wherein generating the 3D model comprises updating the 3D model using multiple depth images and corresponding segmentation masks obtained over a period of time.

15. The device of claim 14, wherein the updating comprises updating a first portion of the 3D model at a higher rate than a second portion of the 3D model.

16. The device of claim 11, wherein the first object the segmentation mask identifies in the portion of the second image is associated with a person.

17. The device of claim 11, wherein the first object the segmentation mask identifies in the portion of the second image is associated with an animal.

18. The device of claim 11, wherein the first object the segmentation mask identifies in the portion of the second image is associated with motion.

19. The device of claim 11, wherein the segmentation mask uses a machine learning model that uses a representation of the second image as input.

20. A non-transitory computer-readable storage medium, storing computer-executable program instructions on a computer to perform operations comprising:
   obtaining depth data associated with a first image of an environment that includes one or more objects;
   determining that a first object of the one or more objects is moving in the environment while obtaining the depth data; and
   in response to determining that the first object is moving in the environment while obtaining the depth data:
      obtaining a segmentation mask associated with a second image of the environment, the segmentation mask identifying a portion of the second image associated with the first object; and
      generating a 3D model of the environment that excludes the first object that is determined to be moving in the environment based on the depth data and the segmentation mask, wherein the 3D model excludes the first object based on excluding depth data associated with the identified portion of the second image associated with the first object.

* * * * *

UNITED STATES PATENT AND TRADEMARK OFFICE
CERTIFICATE OF CORRECTION

| | | |
|---|---|---|
| PATENT NO. | : 12,236,526 B1 | Page 1 of 1 |
| APPLICATION NO. | : 18/126649 | |
| DATED | : February 25, 2025 | |
| INVENTOR(S) | : Praveen Gowda Ippadi Veerabhadre Gowda and Quinton L. Petty | |

It is certified that error appears in the above-identified patent and that said Letters Patent is hereby corrected as shown below:

On the Title Page

ABSTRACT, Item (57), Line 2, reads:
"...systems, and methods that determines generates..."
Should read:
--...systems, and methods that determine and generate...--

Signed and Sealed this
Twenty-second Day of April, 2025

Coke Morgan Stewart
*Acting Director of the United States Patent and Trademark Office*